(12) United States Patent
Wang et al.

(10) Patent No.: US 9,635,097 B2
(45) Date of Patent: Apr. 25, 2017

(54) CLOUD COMPUTING SYSTEM AND METHOD FOR MANAGING STORAGE RESOURCES THEREIN

(71) Applicant: Huawei Technologies Co., Ltd., Shenzhen (CN)

(72) Inventors: Li Wang, Xi'an (CN); Yizhen Xu, Shanghai (CN); Xiaoming Wu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 14/307,560

(22) Filed: Jun. 18, 2014

(65) Prior Publication Data

US 2014/0297733 A1  Oct. 2, 2014

Related U.S. Application Data

(63) Continuation of application No. PCT/CN2011/084925, filed on Dec. 29, 2011.

(51) Int. Cl.
*H04L 29/08* (2006.01)
*G06F 3/06* (2006.01)
*G06F 9/50* (2006.01)

(52) U.S. Cl.
CPC ............ *H04L 67/10* (2013.01); *G06F 3/0605* (2013.01); *G06F 3/067* (2013.01); *G06F 3/0644* (2013.01);
(Continued)

(58) Field of Classification Search
USPC ........................................... 709/203
See application file for complete search history.

(56) References Cited

U.S. PATENT DOCUMENTS

| 7,093,035 B2* | 8/2006 | Hashimoto | G06F 9/5077 710/36 |
| 8,495,323 B1* | 7/2013 | Tatavarty | G06F 9/45558 711/164 |

(Continued)

FOREIGN PATENT DOCUMENTS

| CN | 1652084 A | 8/2005 |
| CN | 1684435 A | 10/2005 |

(Continued)

OTHER PUBLICATIONS

Wood, T., et al., "The Case for Enterprise-Ready Virtual Private Clouds," XP002634215, Proceedings of the 2009 Conference on Hot Topics in Cloud Computing, Jun. 19, 2009, 6 pages.

(Continued)

*Primary Examiner* — Azizul Choudhury
(74) *Attorney, Agent, or Firm* — Conley Rose, P.C.

(57) ABSTRACT

A cloud computing system and a method therein. The cloud computing system includes: a resource server cluster, where the resource server cluster includes at least two resource servers, each resource server in the resource server cluster has at least one type of resources of computing resources and storage resources, and at least one resource server in the resource server cluster has computing resources and storage resources; a computing resource management module configured to manage the computing resources in the resource server cluster, so as to provide a virtual computing service; and a storage resource management module configured to manage a shared storage resource pool established using the storage resources in the resource server cluster, so as to provide a virtual storage service, where storage resources included in each storage resource pool are from at least two resource servers in the resource server cluster.

16 Claims, 4 Drawing Sheets

(52) U.S. Cl.
CPC ........ *G06F 9/5072* (2013.01); *H04L 67/1097* (2013.01)

(56) References Cited

U.S. PATENT DOCUMENTS

| | | | | |
|---|---|---|---|---|
| 8,782,323 | B2* | 7/2014 | Glikson | G06F 12/0813 711/6 |
| 8,805,951 | B1* | 8/2014 | Faibish | G06F 9/5072 709/213 |
| 9,047,313 | B2* | 6/2015 | Baron | G06F 17/30238 |
| 2004/0215749 | A1* | 10/2004 | Tsao | H04L 41/12 709/220 |
| 2007/0288247 | A1* | 12/2007 | Mackay | G06Q 10/00 705/1.1 |
| 2010/0177631 | A1 | 7/2010 | Chen et al. | |
| 2010/0199285 | A1 | 8/2010 | Medovich | |
| 2010/0293269 | A1* | 11/2010 | Wilson | H04L 12/24 709/224 |
| 2010/0293544 | A1* | 11/2010 | Wilson | G06F 9/4401 718/1 |
| 2011/0125951 | A1 | 5/2011 | Youngworth | |
| 2011/0179132 | A1* | 7/2011 | Mayo | G06F 9/5077 709/213 |
| 2011/0199891 | A1 | 8/2011 | Chen | |
| 2011/0231899 | A1* | 9/2011 | Pulier | G06F 9/45558 726/1 |
| 2011/0265085 | A1* | 10/2011 | Kedem | G06F 9/45558 718/1 |
| 2012/0047502 | A1* | 2/2012 | Hashimoto | G06F 9/5077 718/1 |
| 2012/0069745 | A1 | 3/2012 | Kini et al. | |
| 2012/0117571 | A1* | 5/2012 | Davis | H04L 41/0806 718/105 |
| 2012/0158806 | A1* | 6/2012 | Snyder | H04L 67/1097 707/827 |
| 2012/0266162 | A1* | 10/2012 | Baron | G06F 9/45558 718/1 |
| 2014/0064056 | A1* | 3/2014 | Sakata | H04L 41/00 370/216 |

FOREIGN PATENT DOCUMENTS

| | | |
|---|---|---|
| CN | 101241476 A | 8/2008 |
| CN | 101604226 A | 12/2009 |
| CN | 101969391 A | 2/2011 |
| CN | 101997918 A | 3/2011 |
| CN | 103098426 A | 5/2013 |
| WO | 2011103817 A1 | 9/2011 |

OTHER PUBLICATIONS

Foreign Communication From a Counterpart Application, European Application No. 11879079.9, Extended European Search Report dated Oct. 21, 2014, 7 pages.
Foreign Communication From a Counterpart Application, PCT Application PCT/CN2014/080218, International Search Report, dated Jun. 18, 2014, 7 pages.
Foreign Communication From a Counterpart Application, PCT Application PCT/CN2014/080218, Written Opinion dated Jun. 18, 2014, 5 pages.
Partial English Translation and Abstract of Chinese Patent Application No. CN101969391A, Aug. 20, 2014, 9 pages.
Foreign Communication From a Counterpart Application, PCT Application No. PCT/CN2011/084925, English Translation of International Search Report dated Oct. 18, 2012, 2 pages.
Foreign Communication From a Counterpart Application, PCT Application No. PCT/CN2011/084925, English Translation of Written Opinion dated Oct. 18, 2012, 12 pages.
Foreign Communication From a Counterpart Application, PCT Application No. PCT/CN2011/084925, International Search Report dated Oct. 18, 2012, 3 pages.
Foreign Communication From a Counterpart Application, PCT Application No. PCT/CN2011/084925, Written Opinion dated Oct. 18, 2012, 6 pages.
Foreign Communication From a Counterpart Application, Chinese Application No. 201180003187.5, Chinese Office Action dated Mar. 8, 2016, 6 pages.

* cited by examiner

CLOUD COMPUTING SYSTEM AND METHOD FOR MANAGING STORAGE RESOURCES THEREIN

CROSS-REFERENCE TO RELATED APPLICATION

This application is a continuation of International Application No. PCT/CN2011/084925, filed on Dec. 29, 2011, which is hereby incorporated by reference in its entirety.

TECHNICAL FIELD

The present invention relates to the field of cloud computing, and in particular, to a cloud computing system and a method for managing storage resources therein in the field of cloud computing.

BACKGROUND

With further development of a computer network and a requirement of a mass data computing capability, various computer hardware with a strong computing capability constantly emerges. In addition, a global information system World Wide Web is also very popular. The emergence of these software and hardware technologies or devices provides a possibility to put forward a new type of computing model referred to as "cloud computing".

In a narrow sense, cloud computing refers to a delivery and usage mode of an information technology (IT) infrastructure, that is, obtaining required resources using a network in an on-demand and ease-of-scalability manner; and a network providing resources is called "cloud". In the view of a user, resources in the "cloud" may be infinitely extended, and may be acquired at any time, extended at any time, used on-demand, and paid according to usage.

In a broad sense, cloud computing refers to a delivery and usage mode of a service, that is, obtaining a required service using a network in an on-demand and ease-of-scalability manner. This service may relate to IT, software, and Internet, and may also be another service, and the network providing the service is called "cloud". The "cloud" is virtual computing resources capable of implementing self-maintenance and self-management, which generally are large server clusters, including a computing server, a storage server, and broadband resources. Cloud computing implements unified management and scheduling for a large amount of computing resources connected using a network, where the computing resources form a computing resource pool, so as to provide on-demand services for users.

Because cloud computing has features such as a very large scale, virtualization, a high reliability, commonality, a high scalability, and an on-demand service, cloud computing increasingly attracts wide attention.

In a cloud computing application, a cloud computing system integrates computing resources, storage resources, and network resources, and provides the resources for users by means of a network using technologies such as virtualization. An application form, for example, is lease of a virtual machine (VM), a computing capability, and a storage capability.

At present, due to reasons such as different types of resource requirements, computing resources and storage resources provided by the cloud computing system generally require different devices and are independently deployed. For example, an independently deployed computing resource requires a computing device, and an independently deployed storage resource requires a storage device, for example, a dedicated storage array or storage server such as a storage area network (SAN), thereby providing services to the outside.

Because the computing device and the storage device are independently deployed, a device investment cost of the cloud computing system is high, occupied space is large, and a lot of energy is lost. In another aspect, each storage device independently provides a storage service to the outside, a utilization rate of storage resources is low, and reliability is poor.

SUMMARY

Embodiments of the present invention provide a cloud computing system and a method for managing storage resources therein, which are capable of reducing a system cost, and improving a utilization rate of storage resources and reliability of the system.

According to one aspect, an embodiment of the present invention provides a cloud computing system, and the cloud computing system includes: a resource server cluster, where the resource server cluster includes at least two resource servers, each resource server in the resource server cluster has at least one type of resources of computing resources and storage resources, and at least one resource server in the resource server cluster has computing resources and storage resources; a computing resource management module configured to manage the computing resources in the resource server cluster, so as to provide a virtual computing service; and a storage resource management module configured to manage a shared storage resource pool established using the storage resources in the resource server cluster, so as to provide a virtual storage service, where storage resources included in each storage resource pool are from at least two resource servers in the resource server cluster.

According to another aspect, an embodiment of the present invention provides a method for managing storage resources in a cloud computing system, where the cloud computing system includes a resource server cluster, a storage resource management module, and a resource access module; and the method includes receiving, by the storage resource management module, a resource request that is sent by a user and used to request a virtual storage resource; and allocating, by the storage resource management module, a physical storage resource slice corresponding to the resource request in a shared storage resource pool, where storage resources included in the physical storage resource slice are from at least two resource servers in the resource server cluster, each resource server in the resource server cluster has at least one type of resources of computing resources and storage resources, and at least one resource server in the resource server cluster has computing resources and storage resources.

Based on the foregoing technical solutions, the cloud computing system and the method for managing storage resources therein in the embodiments of the present invention, by jointly deploying storage resources and computing resources in the cloud computing system, and establishing a unified and shared storage resource pool using the storage resources to provide a virtual storage service, are capable of saving a device investment cost, a device space occupation cost, and a device energy consumption cost on the one hand, and are capable of balancing storage resources of resource servers and improving a utilization rate of the storage resources and reliability on the other hand, thereby remarkably improving user experience.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
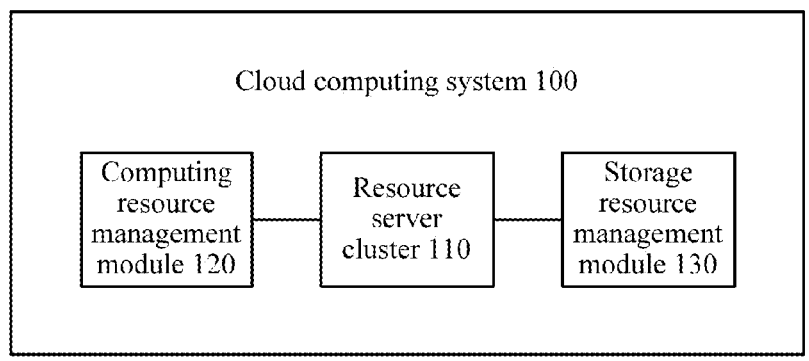
FIG. 1 is a schematic block diagram of a cloud computing system according to an embodiment of the present invention.

FIG. 1 shows a schematic block diagram of a cloud computing system 100 according to an embodiment of the present invention. As shown in FIG. 1, the cloud computing system 100 includes a resource server cluster 110, where the resource server cluster 110 includes at least two resource servers, each resource server in the resource server cluster has at least one type of resources of computing resources and storage resources, and at least one resource server in the resource server cluster has computing resources and storage resources; a computing resource management module 120 configured to manage the computing resources in the resource server cluster, so as to provide a virtual computing service; and a storage resource management module 130 configured to manage a shared storage resource pool established using the storage resources in the resource server cluster, so as to provide a virtual storage service, where storage resources included in each storage resource pool are from at least two resource servers in the resource server cluster.

In this embodiment of the present invention, in the cloud computing system 100, a device providing computing resources and storage resources is from the resource server cluster, the resource server cluster is formed by two or more than two resource servers, each resource server is capable of providing computing resources and/or storage resources, and at least one resource server is capable of providing both computing resources and storage resources. Therefore, the computing resource management module 120 in the cloud computing system 100 provides a virtual computing service by managing the computing resources in the resource server cluster 110; and the storage resource management module 130 in the cloud computing system 100 provides a virtual storage service by managing one or more shared storage resource pools, where the shared storage resource pools are established using the storage resources in the resource server cluster 110, and storage resources included in each storage resource pool are from two or more than two resource servers in the resource server cluster 110.

In this embodiment of the present invention, because each resource server in the resource server cluster 110 has at least one type of resources of computing resources and storage resources, and at least one resource server in the resource server cluster 110 has computing resources and storage resources, that is, the storage resources and the computing resources in the cloud computing system 100 are jointly deployed; therefore, a device investment cost, a device space occupation cost, and a device energy consumption cost can be saved; and because the storage resource pool is established using the storage resources of at least two resource servers in the resource server cluster 110, storage resources of resource servers can be balanced, and a utilization rate of the storage resources and reliability can be improved.

Therefore, the cloud computing system 100 in this embodiment of the present invention, by jointly deploying storage resources and computing resources in the cloud computing system 100, and establishing a unified and shared storage resource pool using the storage resources to provide a virtual storage service, is capable of saving a device investment cost, a device space occupation cost, and a device energy consumption cost on the one hand, and is capable of balancing storage resources of resource servers and improving a utilization rate of the storage resources and reliability on the other hand, thereby remarkably improving user experience.

It should be understood that in this specification, a term "and/or" is only an associative relationship for describing associated objects, indicating that three relationships may exist, for example, A and/or B, which may indicate three situations: A exists independently; A and B exist simultaneously; and B exists independently. In addition, in this specification, a character "/" generally indicates a "or" relationship between a former and a later associated objects.

In this embodiment of the present invention, the computing resource management module 120 or the storage resource management module 130 may be deployed on a resource server, and may also be independently deployed; and the computing resource management module 120 and the storage resource management module 130 may be jointly deployed, and may also be independently deployed.

In this embodiment of the present invention, optionally, the storage resource management module 130 is further configured to create and manage the storage resource pool using a distributed algorithm. For example, the storage resource management module 130 creates and manages the storage resource pool using a distributed algorithm such as a distributed hash table (DHT) method or a pseudo random algorithm, so that the cloud computing system 100 can provide a unified and shared storage service.

It should be understood that in this embodiment of the present invention, the computing resource management module 120 may also use a distributed algorithm to create and manage the computing resource pool, so as to provide a unified and shared computing service. It should further be understood that in this embodiment of the present invention, only that the computing resource management module 120 and the storage resource management module 130 manage the computing resources and the storage resources respectively using a distributed algorithm is used as an example; certainly, another method may also be used to manage the computing resources and the storage resources, which is not limited thereto in this embodiment of the present invention.

In this embodiment of the present invention, the computing resources and the storage resources use a unified hardware server architecture and are jointly deployed; therefore, a computing capability and a storage capability of a physical server can be made full use of. That is, each resource server included in the cloud computing system 100 is capable of providing computing resources and/or storage resources. In terms of a deployment form, a resource server providing storage resources and/or computing resources is a same physical device in terms of a physical deployment form, that is, the storage resources and the computing resources are jointly deployed on a server, but the computing resources and the storage resources are mutually independent in logic and are capable of separately forming their own resource pools.

Figure 2:
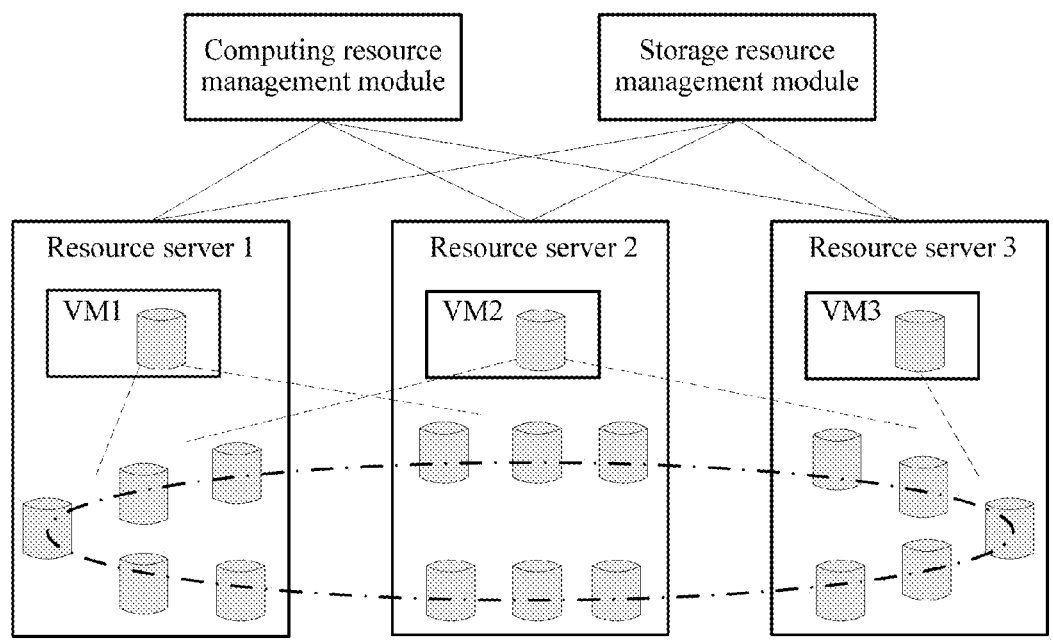
FIG. 2 is a schematic block diagram of joint deployment of computing resources and storage resources according to an embodiment of the present invention.

Specifically, as shown in FIG. 2, for example, the cloud computing system may include a computing resource management module, a storage resource management module, and a resource server cluster, where the resource server cluster includes three resource servers, that is, a resource server 1, a resource server 2, and a resource server 3; each resource server has computing resources and storage resources, and storage resources included in the three resource servers form a unified and shared storage resource pool; and therefore, storage resources forming a logical storage device may be from any one or more resource servers of the three resource servers. For example, computing resources of a virtual machine VM1 created on the resource server 1 are from the resource server 1, and storage resources of the VM1 are from the resource server 1 and the resource server 2; for example, storage resources of a virtual machine VM3 created on the resource server 3 are only from the resource server 3.

It should be understood that in the embodiment shown in FIG. 2, only that the computing resource management module and the storage resource management module are independently deployed is used as an example for description, and that the resource server cluster only includes three resource servers and each resource server has storage resources and computing resources is used as an example for description, which is, however, not limited thereto in this embodiment of the present invention.

In this embodiment of the present invention, optionally, each resource server in the resource server cluster has computing resources and storage resources. Therefore, a device cost, a space cost, and an energy consumption cost of the cloud computing system can be remarkably saved, and complementation and mutual use of a computing server and a storage server can be implemented.

Figure 3:
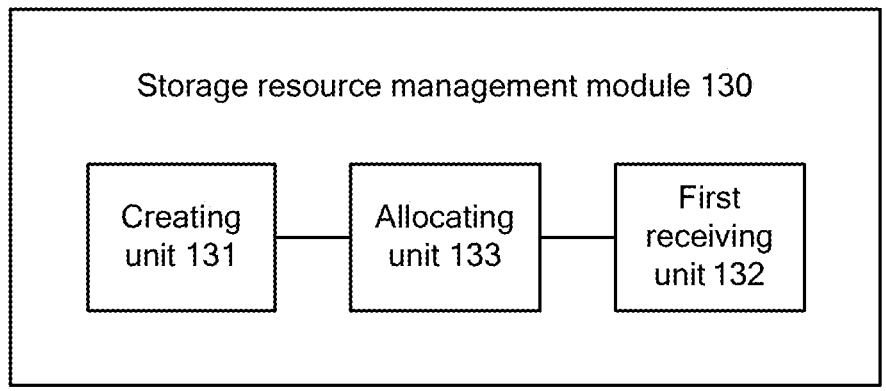
FIG. 3 is a schematic block diagram of a storage resource management module according to an embodiment of the present invention.

In this embodiment of the present invention, optionally, as shown in FIG. 3, the storage resource management module 130 includes a creating unit 131 configured to establish at least one shared storage resource pool using the storage resources in the resource server cluster.

For example, the creating unit 131 may use a distributed architecture, and establish the at least one shared storage resource pool using the storage resources in the resource server cluster. For example, a unified and shared storage resource pool is established using a distributed hash table (DHT) method. Certainly, the creating unit 131 may also use another manner or method to establish the storage resource pool.

Therefore, the cloud computing system provides a shared storage service by establishing the shared storage resource pool using the storage resources of resource servers, so that a source of storage resources of a logical storage device provided by the cloud computing system may be all hard disks or some hard disks included in the resource server cluster, but may not be limited to a local hard disk of a resource server on which the virtual machine is located, or limited to an independent storage server; therefore, a utilization rate of the storage resources can be remarkably improved.

In addition, in this embodiment of the present invention, because the storage resources form the unified and shared storage resource pool, if the cloud computing system uses a data redundancy technology, an impact on storage service providing can be avoided when a single point of a server fails.

It should be understood that in this embodiment of the present invention, the storage resources in the storage resource pool may be from some storage resources of the resource servers, and may be from all storage resources in the resource servers, except storage resources occupied by an operating system and the like.

Optionally, the creating unit 131 is further configured to use a single disk of a resource server included in the resource server cluster as an independent node to establish the storage resource pool.

That is, the creating unit 131 may use a single hard disk as a resource management granularity and add the single hard disk into the storage resource pool for service sharing and use. Compared with using an entire resource server as the resource management granularity, the cloud computing system in this embodiment of the present invention uses a smaller resource management granularity, so that resource waste caused by an oversized resource granularity can be avoided, thereby improving a resource utilization rate, and improving a storage service capability of the cloud computing system.

It should be understood that a VM service can be deployed and carried on a resource server, and a storage service program (Storage server) can also be deployed on the resource server to manage a local disk, integrate local storage resources, and add the local storage resources into a virtual storage resource pool. In this embodiment of the present invention, a hard disk may be used as the resource management granularity, and a node may also be used as the resource management granularity to add the storage resources of the resource server into the system to establish the storage resource pool. When a server or a disk is to be added into the storage resource pool, a storage management process (or referred to as a service program) deployed on the resource server sends a message to the storage resource management module 130, so as to apply for registration with and addition into a shared storage resource pool. After receiving the request and confirming the addition of the server or the disk, the storage resource management module 130 may add information of the server or the disk into the storage resource pool, and send relevant configuration and information about the storage resource pool to an added node, so that the system can perform adjustment according to a configured policy, thereby completing establishment or expansion of the storage resource pool. It should be further understood that a capacity reduction process of the storage resource pool is similar to the foregoing process; for brevity, details are not described herein again.

In this embodiment of the present invention, optionally, as shown in FIG. 3, the storage resource management module 130 includes: a first receiving unit 132 configured to receive a resource creation request that is sent by a user and used to request creation of a virtual storage resource; and an allocating unit 133 configured to allocate, according to the resource creation request, a physical storage resource slice corresponding to the resource request in the storage resource pool.

It should be understood that the physical storage resource slice may be from one resource server in the resource server cluster, and may also be from two or more than two resource servers in the resource server cluster; alternatively, the physical storage resource slice may be from a hard disk in a resource server, and may also be from two or more than two hard disks in the resource server, which is not limited thereto in this embodiment of the present invention.

Figure 4:
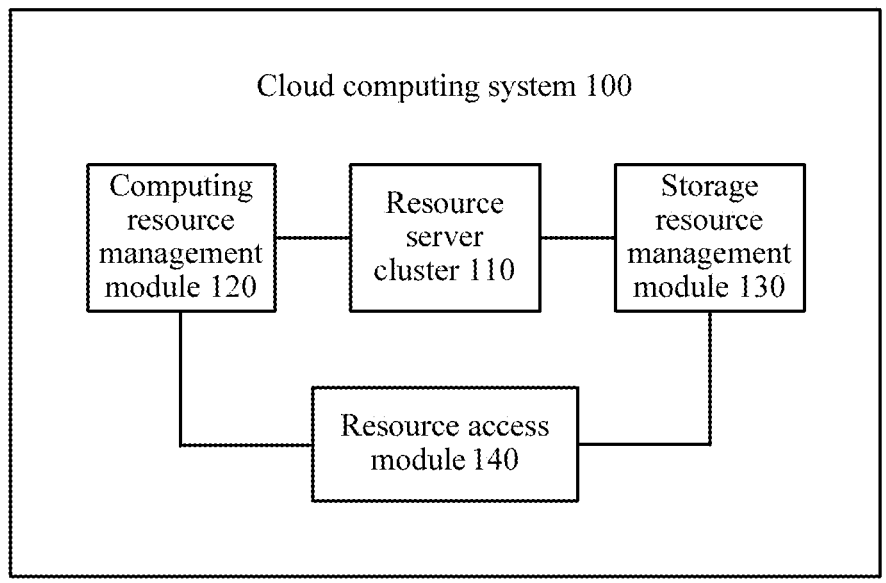
FIG. 4 is another schematic block diagram of a cloud computing system according to an embodiment of the present invention.
Figure 5:
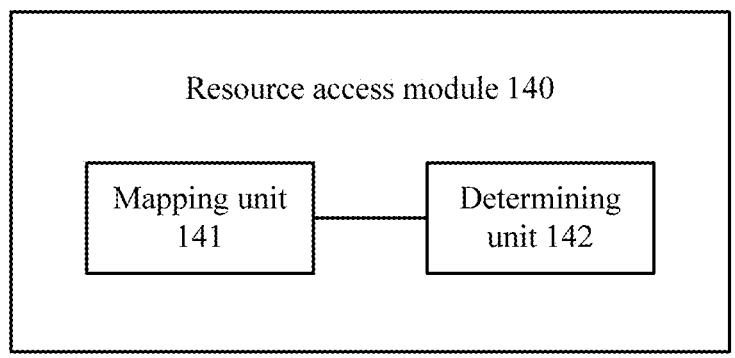
FIG. 5 is a schematic block diagram of a resource access module according to an embodiment of the present invention.

In this embodiment of the present invention, optionally, as shown in FIG. 4 and FIG. 5, the cloud computing system 100 further includes a resource access module 140, and the resource access module 140 includes a mapping unit 141 configured to map the physical storage resource slice allocated by the allocating unit into a logical storage device for the user to use.

Optionally, the mapping unit 141 is further configured to map the physical storage resource slice into the logical storage device complying with a Fiber Channel (FC) protocol, an Internet Small Computer System Interface (iSCSI) protocol, a Network Block Device (NBD) protocol, a Key-Value interface, or a file system interface.

That is, the cloud computing system integrates storage resources using a storage virtualization technology and exposes the storage resources for an upper-layer application to use using the logical storage device in a remote storage device form such as an iSCSI and an NBD or using a local protocol; for example, a virtual hard disk serving as a virtual machine is directly exposed to the outside as a storage block device or is directly exposed to the outside using a Key-Value interface to provide a storage service; for example, the logical storage device is used by the user in an application form such as a backup system, a remote disk, or a web disk.

When the user applies for storage resources and performs an operation on an obtained logical storage device, for example, performs a read or write operation, the resource access module included in the cloud computing system further provides functions such as routing and selection of a node to which an input/output (I/O) belongs. Therefore, in this embodiment of the present invention, optionally, as shown in FIG. 5, the resource access module 140 further includes a determining unit 142 configured to determine, when an operation request for the logical storage device is received, a location of a physical storage resource slice corresponding to the logical storage device.

For example, the determining unit 142 of the resource access module 140 may determine, using a distributed algorithm such as DHT or a pseudo random algorithm, a specific location, for example, a sector location, of a physical disk or a physical storage resource slice corresponding to the logical storage device, thereby performing an operation such as a read or write operation on the physical storage resource slice.

Figure 6:
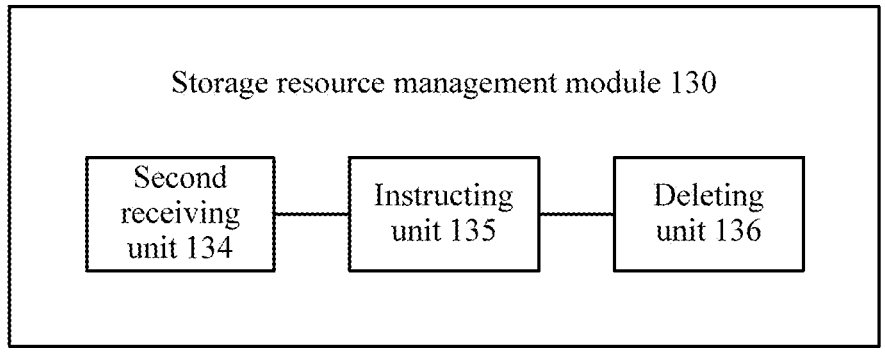
FIG. 6 is another schematic block diagram of a storage resource management module according to an embodiment of the present invention.

When the user completes using a virtual storage resource, the cloud computing system is capable of releasing and recycling the virtual storage resource for another user to use. Therefore, in this embodiment of the present invention, optionally, as shown in FIG. 6, the storage resource management module 130 includes: a second receiving unit 134 configured to receive a resource deletion request that is sent by a user and used to request deletion of a logical storage device; an instructing unit 135 configured to instruct, according to the resource deletion request, the resource access module corresponding to the logical storage device to release a physical storage resource of a corresponding resource server in a specified area; and a deleting unit 136 configured to delete, according to the resource deletion request, information corresponding to the logical storage device.

It should be understood that after the resource access module corresponding to the logical storage device receives the instruction, the physical storage resource of the corresponding resource server in the specified area can be released.

Therefore, the cloud computing system in this embodiment of the present invention, by jointly deploying storage resources and computing resources in the cloud computing system, and establishing a unified and shared storage resource pool using the storage resources to provide a virtual storage service, is capable of saving a device investment cost, a device space occupation cost, and a device energy consumption cost on the one hand, and is capable of balancing storage resources of resource servers and improving a utilization rate of the storage resources and reliability on the other hand, thereby remarkably improving user experience.

Figure 7:
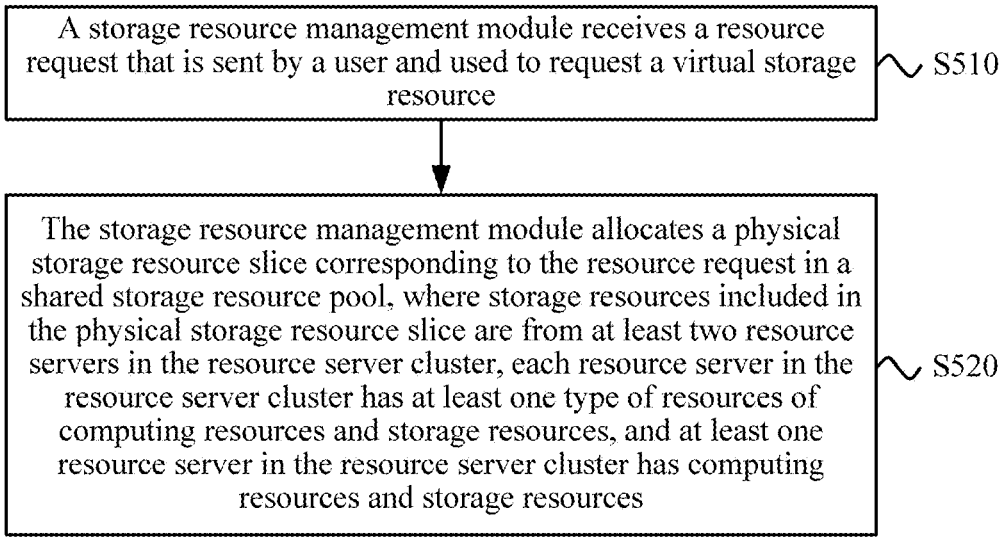
FIG. 7 is a schematic flowchart of a method for managing storage resources in a cloud computing system according to an embodiment of the present invention.
Figure 8:
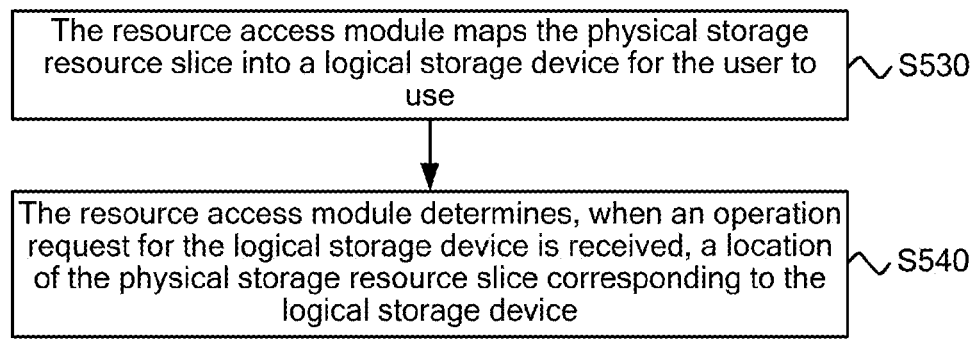
FIG. 8 is another schematic flowchart of a method for managing storage resources in a cloud computing system according to an embodiment of the present invention.
Figure 9:
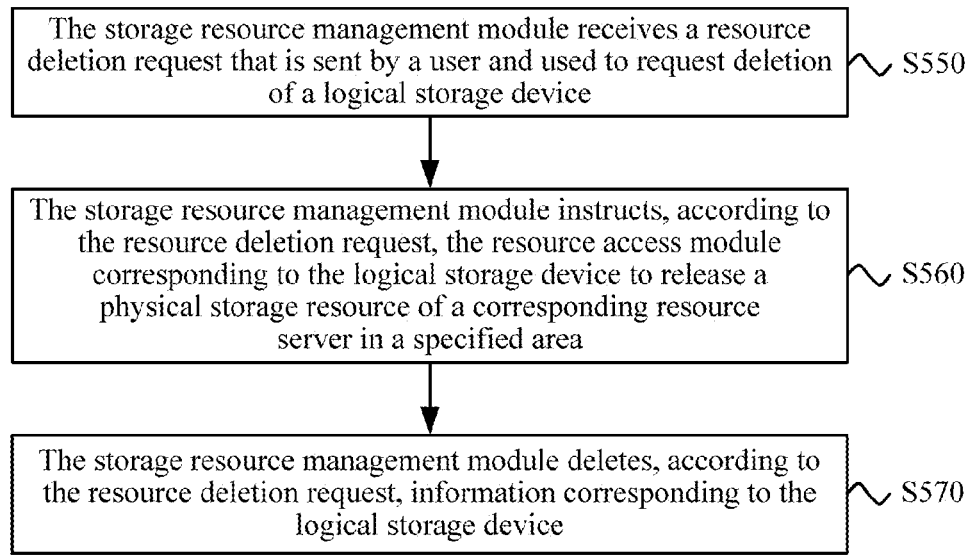
FIG. 9 is still another schematic flowchart of a method for managing storage resources in a cloud computing system according to an embodiment of the present invention.

The foregoing describes in detail the cloud computing system according to an embodiment of the present invention with reference to FIG. 1 to FIG. 6, and the following describes in detail a method for managing storage resources in a cloud computing system according to an embodiment of the present invention with reference to FIG. 7 to FIG. 9.

FIG. 7 shows a schematic flowchart of a method 500 for managing storage resources in a cloud computing system according to an embodiment of the present invention. The cloud computing system includes a resource server cluster, a storage resource management module, and a resource access module. As shown in FIG. 7, the method 500 includes:

S510. The storage resource management module receives a resource request that is sent by a user and used to request a virtual storage resource; and S520. The storage resource management module allocates a physical storage resource slice corresponding to the resource request in a shared storage resource pool, where storage resources included in the physical storage resource slice are from at least two resource servers in the resource server cluster, each resource server in the resource server cluster has at least one type of resources of computing resources and storage resources, and at least one resource server in the resource server cluster has computing resources and storage resources.

Therefore, the method for managing storage resources in a cloud computing system according to this embodiment of the present invention, by jointly deploying storage resources and computing resources in the cloud computing system, and establishing a unified and shared storage resource pool using the storage resources to provide a virtual storage service, is capable of saving a device investment cost, a device space occupation cost, and a device energy consumption cost on the one hand, and is capable of balancing storage resources of resource servers and improving a utilization rate of the storage resources and reliability on the other hand, thereby remarkably improving user experience.

In this embodiment of the present invention, allocating, by the storage resource management module, the physical storage resource slice corresponding to the resource request in the shared storage resource pool includes allocating, by the storage resource management module, the physical storage resource slice corresponding to the resource request in the shared storage resource pool established using a single disk of a resource server as an independent node.

Therefore, compared with using an entire resource server as the resource management granularity, the method according to this embodiment of the present invention uses a smaller resource management granularity, so that resource waste caused by an oversized resource granularity can be avoided, thereby improving a resource utilization rate, and improving a storage service capability of the cloud computing system.

In this embodiment of the present invention, as shown in FIG. 8, optionally, the method 500 further includes:

S530. The resource access module maps the physical storage resource slice into a logical storage device for the user to use.

Optionally, the resource access module maps the storage resource slice into the logical storage device complying with a Fiber Channel (FC) protocol, an Internet Small Computer System Interface (iSCSI) protocol, a Network Block Device (NBD) protocol, a key-value interface, or a file system interface.

When the user applies for storage resources and performs an operation on an obtained logical storage device, for example, performs a read or write operation, the method 500 according to this embodiment of the present invention further includes:

S540. The resource access module determines, when an operation request for the logical storage device is received, a location of the physical storage resource slice corresponding to the logical storage device.

For example, a determining unit of the resource access module may determine, using a distributed algorithm such as DHT or a pseudo random algorithm, a specific location, for example, a sector location, of a physical disk or a physical storage resource slice corresponding to the logical storage device, thereby performing an operation such as a read or write operation on the physical storage resource slice.

When the user completes using a virtual storage resource, the cloud computing system is capable of releasing and recycling the virtual storage resource for another user to use. Therefore, in this embodiment of the present invention, optionally, as shown in FIG. 9, the method 500 further includes:

S550. The storage resource management module receives a resource deletion request that is sent by a user and used to request deletion of a logical storage device.

S560. The storage resource management module instructs, according to the resource deletion request, the resource access module corresponding to the logical storage device to release a physical storage resource of a corresponding resource server in a specified area.

S570. The storage resource management module deletes, according to the resource deletion request, information corresponding to the logical storage device.

It should be understood that in various embodiments of the present invention, a value of a sequence number in the foregoing processes does not indicate an execution sequence, and an execution sequence of each process is determined by its function and internal logic, which shall not constitute any limitation to an implementation process of an embodiment of the present invention.

It should further be understood that a cloud computing system 100 according to an embodiment of the present invention may correspond to the cloud computing system 100 in the method according to this embodiment of the present invention, and operations and/or functions of various modules in the cloud computing system 100 are respectively used for implementing corresponding processes of the method 500 in FIG. 7 to FIG. 9.

Therefore, the method for managing storage resources in a cloud computing system according to this embodiment of the present invention, by jointly deploying storage resources and computing resources in the cloud computing system, and establishing a unified and shared storage resource pool using the storage resources to provide a virtual storage service, is capable of saving a device investment cost, a device space occupation cost, and a device energy consumption cost on the one hand, and is capable of balancing storage resources of resource servers and improving a utilization rate of the storage resources and reliability on the other hand, thereby remarkably improving user experience.

The following uses creating a storage volume device of a virtual machine (VM) as an example to describe in detail the method according to the embodiment of the present invention, where the virtual storage resource is mounted in a form of a block device for the VM to use.

S1. A user may apply a storage volume device for a VM using a management interface or a self-service platform.

S2. After receiving a creation application, a cloud computing system is capable of using a storage resource management module to divide a logical storage volume device with a space size applied for by the user, and is capable of using a resource access module to map the logical storage volume device to the VM for use. The resource access module, for example, is a storage service module deployed on a resource server. The volume device may be used by the user in a network storage protocol or local protocol manner. Components and resource sources of the logical volume device are all hard disks or some hard disks of a resource server cluster in the entire cloud computing system, but are not only from a local hard disk of a resource server on which the VM is located.

S3. When the VM uses the volume device, the resource access module deployed on the resource server is capable of integrating, using a storage virtualization technology, storage resource slices provided by local disks of resource servers, thereby mapping the storage resource slices into a logical storage device, and mounting, using an NBD or iSCSI protocol, the logical storage device for the VM to use. Then, the VM is capable of using the logical storage device like using a local disk of a common computer.

S4. The user may use the volume device to perform a data read or write operation, where a process of the write operation may be as follows:

(1) The VM (on an application side) has successfully applied for a logical volume device, has completed mounting and mapping, and is presented as a logical disk device.

(2) When the VM stores a data file in the logical disk device, that is, when there is a write request (PUT) for the logical storage device, data is transferred to the resource access module using memory. Therefore, the data may be written into the logical storage device using a device driver (an NBD, an iSCSI, or the like).

(3) After receiving the request, the resource access module is capable of determining, using a distributed algorithm such as DHT or a pseudo random algorithm, a specific location of a physical disk corresponding to the logical volume device, that is, a physical disk of a resource server corresponding to the logical volume device, a specific sector location, and the like.

(4) Then, the resource access module locates, using a data interface (of block storage, a file system, object storage, Key-Value, or the like, and may also be of another storage interface type), a logical storage node (NODE) using a routing algorithm, and transmits and writes the data into a real physical device. The physical device herein is a local hard disk device of each resource server.

(5) The cloud computing system is capable of performing unified management for all local disks of the resource server using a distributed algorithm (such as DHT), and integrating the local disks into a shared resource pool in logic. Each logical device may be scattered to various disks using the storage virtualization technology, and the resource access module maintains physical-to-logical mapping management of virtual resources and logical-to-physical routing management of the virtual resources; that is, for each read or write service request, routing of a virtual data storage node may be completed using a hash algorithm.

It should be understood that in this embodiment of the present invention, the storage resource management module may be configured to manage a storage volume and/or a node, for example, the storage resource management module may be configured to allocate a storage volume according to a user request, and may also delete a storage volume; the storage resource management module may manage a node status, may also add or delete a node, may further establish a storage resource pool and perform cluster configuration management for the storage resource pool, and the like, which is not limited thereto in this embodiment of the present invention.

It should further be understood that in this embodiment of the present invention, a node may be a single disk, and may also be a resource server on which the disk is located. In this embodiment of the present invention, a first unit of the storage resource management module, which is configured to manage a storage volume, and a second unit of the storage resource management module, which is configured to manage a node, may be separately deployed, and may also be jointly deployed; in addition, the cloud computing system may only include the first unit or the second unit, and may also include the first unit and the second unit, which is not limited thereto in this embodiment of the present invention.

It should be understood that in various embodiments of the present invention, a value of a sequence number in the foregoing processes does not indicate an execution sequence, and an execution sequence of each process is determined by its function and internal logic, which shall not constitute any limitation to an implementation process of an embodiment of the present invention.

Therefore, the cloud computing system and the method for managing storage resources therein in the embodiments of the present invention, by jointly deploying storage resources and computing resources in the cloud computing system, and establishing a unified and shared storage resource pool using the storage resources to provide a virtual storage service, are capable of saving a device investment cost, a device space occupation cost, and a device energy consumption cost on the one hand, and are capable of balancing storage resources of resource servers and improving a utilization rate of the storage resources and reliability on the other hand, thereby remarkably improving user experience.

It should be understood that in the embodiments of the present invention, "B corresponding to A" indicates that B is associated with A, and B may be determined according to A. However, it should further be understood that determining B according to A does not mean that B is determined only according to A, and B may also be determined according to A and/or other information.

It should be understood that in this specification, a term "and/or" is only an associative relationship for describing associated objects, indicating that three relationships may exist, for example, A and/or B, which may indicate three situations: A exists independently; A and B exist simultaneously; and B exists independently. In addition, in this specification, a character "/" generally indicates a "or" relationship between a former and a later associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A cloud computing system, comprising:
at least two servers configured to provide resources for a virtual machine in the cloud computing system, wherein the resources of the at least two servers comprise computing resources and storage resources, and wherein at least one server provides both the computing resources and the storage resources; and
at least one processor configured to:
manage a first set of the at least two servers, wherein the first set comprises the computing resources;
manage a second set of the at least two servers, wherein the second set comprises the storage resources;
obtain respective storage information from each server of the second set; and
group a plurality of local storage devices from the second set into a shared storage resource pool according to the obtained respective storage information of the servers of the second set,
wherein the first set overlaps with the second set at the at least one server,
wherein the computing resource of the virtual machine is allocated from the first set, and
wherein the storage resource of the virtual machine is allocated from the shared storage resource pool that is established based on the second set.

2. The cloud computing system according to claim 1, wherein the processor is further configured to:
receive messages for adding into the shared storage resource pool from the servers of the second set; and
establish the shared storage resource pool by adding the obtained respective storage information of the servers of the second set into the shared storage resource pool.

3. The cloud computing system according to claim 2, wherein a storage service program is deployed on the servers of the second set, and wherein the storage service program is configured to send the messages for adding into the shared storage resource pool to the processor.

4. The cloud computing system according to claim 2, wherein the storage resource processor is further configured to use a single disk of the second set as an independent node to establish the shared storage resource pool.

5. The cloud computing system according to claim 1, wherein the processor is further configured to map the allocated respective storage resource for the virtual machine into a logical storage device for the virtual machine to use.

6. The cloud computing system according to claim 4, wherein the processor is further configured to:
receive an operation request for the logical storage device of the virtual machine; and
determine a physical location information corresponding to the logical storage device.

7. The cloud computing system according to claim 5, wherein the processor is further configured to:
receive a resource deletion request that is sent by the virtual machine and used to request deletion of the logical storage device of the virtual machine; and
release a physical storage resource of a corresponding resource server in a specified area.

8. The cloud computing system according to claim 5, wherein the processor is further configured to map the allocated respective storage resource for the virtual machine into the logical storage device complying with at least one of a Fiber Channel (FC) protocol, an Internet Small Computer System Interface (iSCSI) protocol, a Network Block Device (NBD) protocol, a key-value interface, and a file system interface.

9. A method for allocating resources for a virtual machine in a cloud computing system, comprising:
managing a first set of at least two servers in the cloud computing system, wherein the at least two servers provide resources for the virtual machine in the cloud computing system, wherein the resources of the at least two servers comprises computing resources and storage resources, wherein at least one server provides both the computing resources and the storage resources, and wherein the first set comprises the computing resources;
managing a second set of the at least two servers, wherein the second set has storage resources, and wherein the first set overlaps with the second set at the at least one server;
obtaining respective storage information from each server of the second set; and
grouping a plurality of local storage devices from the second set into a shared storage resource pool according to the obtained respective storage information of the servers of the second set, wherein the computing resource of the virtual machine is allocated from the first set, and wherein the storage resource of the virtual machine is allocated from the shared storage resource pool that is established based on the second set.

10. The method according to claim 9, further comprising:
receives messages for adding into the shared storage resource pool sent from the servers of the second set; and establishes the shared storage resource pool by adding the obtained respective storage information of the servers of the second set into the shared storage resource pool.

11. The method according to claim 10, wherein a storage service program is deployed on the servers of the second set, and wherein the storage service program is configured to send the messages for adding into the shared storage resource pool from the servers of the second set.

12. The method according to claim 10, wherein the establishing the shared storage resource pool comprises establishing the shared storage resource pool using a single disk of the second set as an independent node.

13. The method according to claim 9, further comprising mapping the allocated respective storage resource for the virtual machine into a logical storage device for the virtual machine to use.

14. The method according to claim 13, further comprising:
receiving an operation request for the logical storage device of the virtual machine; and
determining a physical location information corresponding to the logical storage device.

15. The method according to claim 13, further comprising:
receiving a resource deletion request that is sent by the virtual machine and used to request deletion of the logical storage device; and
releasing a physical storage resource of a corresponding resource server in a specified area.

16. The method according to claim 13, wherein mapping the allocated respective storage resource for the virtual machine into a logical storage device comprises mapping the allocated respective storage resource for the virtual machine into the logical storage device complying with at least one of a Fiber Channel (FC) protocol, an Internet Small Computer System Interface (iSCSI) protocol, a Network Block Device (NBD) protocol, a key-value interface, and a file system interface.

* * * * *